Aug. 13, 1940.     W. H. J. FITZGERALD ET AL     2,211,717
PISTON ROD ASSEMBLY
Original Filed July 8, 1937

Inventors.
William H.J.Fitzgerald, deceased
by Josephine M. Fitzgerald, executrix.
Reginald P. Fitzgerald
by Heard Smith & Tennant
Attys.

UNITED STATES PATENT OFFICE 2,211,717

PISTON ROD ASSEMBLY

William H. J. Fitzgerald, deceased, late of Braintree, Mass., by Josephine M. Fitzgerald, executrix, Braintree, Mass., and Reginald P. Fitzgerald, Braintree, Mass., assignors to Pneumatic Drop Hammer Co., Braintree, Mass., a corporation of Massachusetts Original application July 8, 1937, Serial No. 152,545. Divided and this application September 11, 1939, Serial No. 294,240

6 Claims. (Cl. 309—4)

This invention relates to mechanism for fixedly securing a member upon a rod or shaft. More specifically the invention relates to an improved piston and piston rod assembly; and the principal object of the invention is to provide a connection between the piston head and the piston rod which will reliably prevent the piston from becoming loosened on the piston rod, and also to provide a construction which can be readily and economically made and assembled.

The invention as illustrated herein is an improvement upon the construction disclosed in Patent No. 1,924,545, granted to us August 29, 1933, for improvements in Drop hammers; and the purpose of the invention is to provide a more reliable connection between the piston head and the piston than that disclosed in the earlier patent.

The present application also constitutes a division of our prior application, Serial No. 152,545, filed July 8, 1937, for Piston rod connections for drop hammers.

The illustrated embodiment of the invention is shown in the accompanying drawing, in which.

Figure 1:
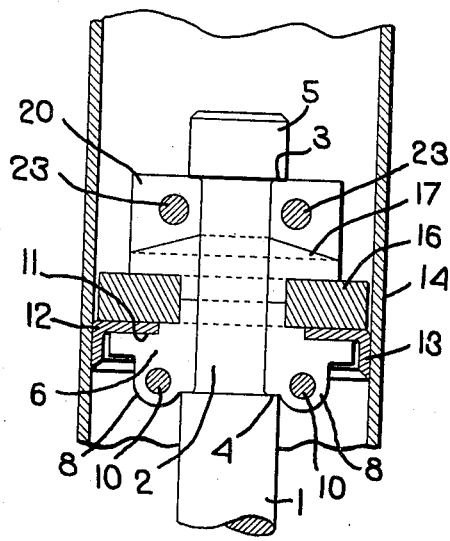
Fig. 1 is a vertical sectional view of a portion of a cylinder and of the piston head assembly, the piston rod being shown in elevation.
Figure 2:
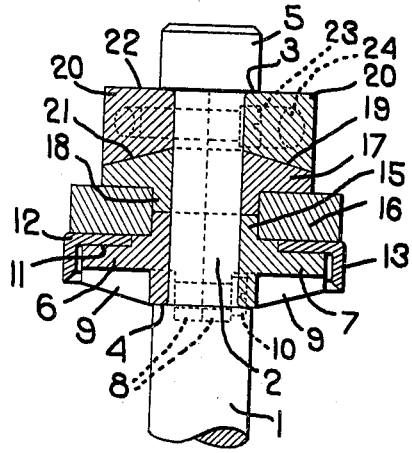
Fig. 2 is a vertical sectional view of the piston and piston rod assembly shown in Fig. 1 in a plane at right angles to that ilustrated in Fig. 1, the piston rod being shown in elevation.
Figure 3:
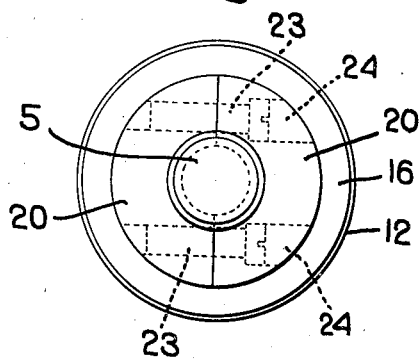
Fig. 3 is a plan view of the piston and piston rod assembly shown in Figs. 1 and 2.
Figure 4:
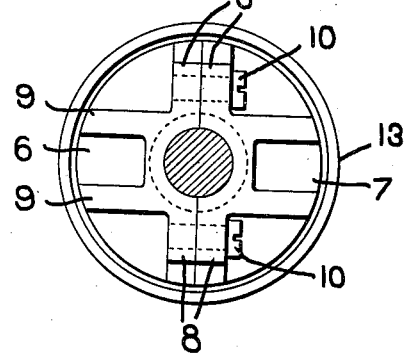
Fig. 4 is an underneath plan view of said constriction.

While the piston and piston rod assembly illustrated herein was primarily designed for use with the lifting cylinders for drop hammers, in which the lower end of the piston rod was connected to a very heavy hammer, it is obviously adapted to be employed in other constructions, and the illustration of the hammer construction which is given in our prior application, Serial No. 152,545, is unnecessary.

It may be stated, however, that the present invention was produced to overcome the loosening of a connection between the piston head and the piston rod, which was found frequently to occur in drop hammer constructions because of the violent jars to which the piston rod and piston are subjected during the use of the drop hammer.

A further object of the invention is to provide mechanism for assembling a piston upon a piston rod in such a manner as to avoid the possibility of detachment of the piston or parts thereof from the piston rod and the blowing out of such parts from the cylinder, which is known to have occurred in pneumatic drop hammer constructions.

These objects of the invention are accomplished by providing the piston rod with a reduced section of smaller diameter and mounting upon such reduced section a piston assembly, all the parts of which are clamped together between the shoulders on the piston rod and are so constructed and arranged that it is impossible for any of them to become detached from the piston rod, even though the clamping mechanism may become loosened, which experience shows rarely occurs in practice.

In the construction illustrated the piston rod 1 is provided near one end with a section 2 of reduced diameter presenting upper and lower shoulders 3 and 4, the end portion 5 of the piston rod preferably being of unreduced diameter.

The piston comprises a head formed in two semi-circular sections 6 and 7, each provided with a central recess adapted to fit tightly upon the reduced section 2 of the piston rod. The piston head abuts at its lower end against a shoulder 4 on the piston rod. As illustrated in the accompanying drawing, the head is provided with downwardly extending strengthening ribs 8 and 9 extending at right angles to each other, the strengthening ribs 8 of adjacent sections being formed with bosses adapted to be clamped together by suitable machine screws 10. The piston head is provided with an annular peripheral recess 11 to receive the horizontal portion of an annular cup packing 12, the outer flange 13 of which is adapted to engage the wall of the cylinder 14. The sectional head is provided adjacent the reduced portion 2 of the shaft with an annular boss 15 having a diameter or cross-sectional area not less than that of the unreduced end portion 5 of the piston rod.

An integral retaining ring 16, the aperture through which is of sufficient diameter to be slipped over the unreduced end portion 5 of the head, is adapted to fit tightly upon the boss 15 which projects upwardly from the head a distance preferably substantially equal to half of the thickness of the ring 16. By reason of this construction the sectional heads may be assembled upon the reduced portion of the shaft, the lower end of the head resting upon the shoulder 4 at the end of the reduced portion, the ring 16 may then be slipped over the end of the shaft and fitted upon the boss 15, thereby clamping the sectional head firmly upon the reduced portion of the shaft.

In order more fully to insure the positive clamping of the piston head upon the shaft, downwardly extending bosses may be clamped together upon the rod by machine screws 10.

Suitable means are provided for clamping the retaining ring, ring packing and the piston head between the shoulders 3 and 4 of the piston rod. In the preferred construction illustrated a lower sectional clamping member 17, which is formed in semi-cylindrical sections, is provided with a downwardly extending boss 18 adapted to fit within the ring 16 and to extend downwardly toward the boss 15. The upper surface of this sectional clamping member is provided with a face 19 which inclines outwardly and downwardly from a complementary sectional clamping member comprising a ring 20 formed in semi-circular sections and having a central recess complementary to the reduced portion of the piston rod. The ring 20 has the lower surface 21 inclined downwardly and outwardly complementary to the surface 19 and engaging the same. The ring 20 has a flat upper surface 22 adapted to engage beneath the shoulders 3 of the piston rod. The adjacent edges of the sections of the clamping member 20 desirably are slightly spaced apart and said sections are connected together by machine screws 23, one of the sections of the clamping ring 20 being provided with recesses 24 to receive the heads of the screws 23, while the other sections are provided with screw threads complementary to the threads on the screws 23.

By reason of this construction the piston can be readily assembled on the piston rod by first placing the sectional piston head 6, 7 upon the reduced portion of the piston rod in abutment with the shoulder 4 upon said rod. The retaining ring 16 may then be slipped over the upper unreduced end of the piston rod and fitted upon the upwardly extending boss 15 of the piston head. Desirably also the machine screws 10 may be inserted to insure the positive clamping of the sections of the head upon the reduced portion of the piston rod. The lower sectional clamping members 17 may then be assembled with the boss 18 thereof extending into the ring 16 as illustrated. Finally the sectional ring 20 is applied to the upper inclined surface of the clamping sections 17 and between it and the shoulder 3 upon the end of the piston rod, and the sections of the clamping ring 20 drawn together by the set screws 23.

As the machine screws 23 are set up, the sections of the ring 20 are drawn toward each other to cause a clamping force to be exerted between the clamping ring 20 and shoulder 3 on one end and between the clamping member 17, the ring 16, packing ring 13, the piston head 7 and the shoulder 4 on the other end, thereby exerting a force lengthwise of the piston rod acting to clamp the parts of the assembly firmly between said shoulders. At the same time the inclined complementary faces 17 and 21 of the clamping members tend to force said sections of the clamping member 17 toward each other and more firmly against the reduced end portion of the piston rod.

Obviously, if the boss 15, which extends upwardly from the body of the piston head, is slightly tapered and the ring 16 provided with a complementary taper, the longitudinal clamping movement of the member 17 would tend to force the retaining ring 16 more firmly upon the boss 15 and consequently clamp the sections of the piston head more firmly upon the reduced section of the piston rod.

By reason of this construction the piston is so securely anchored to the piston rod that it will not become loosened by the repeated jars transmitted to it by the impact of the hammer which is secured to the piston rod.

It will be obvious that the means for assembling the piston head firmly upon the piston rod may be employed for other purposes in which it is desirable to secure a member firmly to a rod or shaft. It is also to be understood that the particular embodiment of the invention which is shown and described herein is of an illustrative character and that various modifications in the construction and arrangement of the parts may be made within the scope of the following claims.

Having thus described the invention, what is claimed as new, and desired to be secured by Letters Patent, is:

1. A device of the class described comprising a rod having a section of predetermined length of reduced diameter providing spaced shoulders, a member to be clamped thereon, of larger diameter than said rod, formed in complementary sections having recesses to fit tightly upon the reduced portion of said shaft, said sectional member on one end engaging one of the shoulders of said shaft and at the other end having a cylindrical boss of at least the cross-sectional area of the unreduced end portion of said rod, an integral retaining ring, adapted to be slipped over the unreduced portion of the rod, tightly fitting upon the boss of said sectional member, and adjustable means interposed between said retaining ring and the other shoulder of said rod operable to clamp said retaining ring, said ring packing, and said head together between the shoulders of said piston rod.

2. A device of the class described comprising a rod having a section of predetermined length of reduced diameter providing spaced shoulders, a member to be clamped thereon, of larger diameter than said rod, formed in complementary sections having recesses to fit tightly upon the reduced portion of said shaft, said sectional member on one end engaging one of the shoulders of said shaft and at the other end having a cylindrical boss of at least the cross-sectional area of the unreduced end portion of said rod, an integral retaining ring, adapted to be slipped over the unreduced portion of the rod, tightly fitting upon the boss of said sectional member, a clamping member engaging said ring and provided opposite said ring with an outwardly and downwardly inclined surface, and a cooperating sectional clamping member interposed between the same and the other shoulder of said rod, and means for drawing the sections of said sectional clamping member together, thereby to exert forces in opposite directions against said shoulders, and to clamp said members firmly together and to said rod.

3. A device of the class described comprising a rod having a section of predetermined length of reduced diameter providing spaced shoulders, a member to be clamped thereon, of larger diameter than said rod, formed in complementary sections having recesses to fit tightly upon the reduced portion of said shaft, said sectional member on one end engaging one of the shoulders of said shaft and at the other end having a cylindrical boss of at least the cross-sectional area of the unreduced end portion of said rod, an integral retaining ring, adapted to be slipped over the unreduced portion of the rod, tightly fitting upon the boss of said sectional member, a sectional clamping member engaging said retaining ring and having a boss extending into said retaining ring and provided at its opposite side with a downwardly and outwardly inclined surface, a cooperating clamping member formed in sections having a surface complementary to said inclined surface, and at its opposite end engaging the other shoulder of said rod, and means for drawing the sections of the latter clamping member toward each other.

4. A piston rod assembly comprising a piston rod having a suitable section of reduced cross-sectional area providing spaced shoulders, a piston head formed in complementary sections having recesses closely fitting the reduced portion of said piston rod and at one end abutting one of said shoulders and at the opposite end presenting a cylindrical boss having an external diameter at least equal to that of the unreduced end of said piston rod, an integral retaining ring, adapted to be slipped over the end of said rod, fitting upon said boss and holding the sections of said head tightly upon the reduced portion of said piston rod, a ring packing positioned between said ring and said head, and adjustable means interposed between said retaining ring and the other shoulder of said piston rod operable to clamp said retaining ring, said ring packing, and said piston head together between the shoulders of said piston rod.

5. A piston rod assembly comprising a piston rod having a suitable section of reduced cross-sectional area providing spaced shoulders, a piston head formed in complementary sections having recesses closely fitting the reduced portion of said piston rod and at one end abutting one of said shoulders and at the opposite end presenting a cylindrical boss having an external diameter at least equal to that of the unreduced end of said piston rod, an integral retaining ring, adapted to be slipped over the end of said rod, fitting upon said boss and holding the sections of said head tightly upon the reduced portion of said piston rod, a ring packing positioned between said ring and said head, a clamping member engaging the face of said retaining ring formed in complementary sections having recesses fitting the reduced section of said piston rod and a boss fitting within said retaining ring and having a downwardly and outwardly inclined upper face, and sectional wedge members interposed between said clamping member and the other shoulder of said piston rod, and provided with an inclined face complementary to and engaging that of the other clamping member, and adjustable means for drawing the wedge members toward each other, thereby to clamp the piston members firmly upon the piston rod and against the shoulders of said rod.

6. A piston rod assembly comprising a piston rod having near one end a cylindrical section of reduced cross-sectional area providing spaced shoulders, a circular piston head of suitable diameter, formed in complementary sections, having a recess closely fitting the reduced portion of said piston rod, and at one end abutting said shoulder, and provided with complementary downwardly extending strengthening ribs provided with means for drawing said ribs toward each other to clamp said head sections upon said piston rod, and having near its periphery an annular recess to receive a packing ring and an upwardly extending cylindrical boss having an external diameter at least equal to that of the unreduced end of said piston rod, an integral retaining ring, adapted to be slipped over the end of said rod, fitting upon said boss and cooperating with said rib clamping means to secure the sections of said head tightly upon the reduced section of said piston rod, a ring packing positioned between said retaining ring and said head, and adjustable means interposed between said retaining ring and the other shoulder of said piston rod operable to clamp said retaining ring, said ring packing, and said piston head together between the shoulders of said piston rod.

JOSEPHINE M. FITZGERALD,
*Executrix of the Last Will and Testament of William H. J. Fitzgerald, Deceased.*
REGINALD P. FITZGERALD.